(12) United States Patent
Christmann

(10) Patent No.: US 9,856,752 B2
(45) Date of Patent: Jan. 2, 2018

(54) EXHAUST-GAS TURBOCHARGER AND METHOD FOR MANUFACTURING THE SAME

(75) Inventor: Ralf Christmann, Kaiserslautern (DE)

(73) Assignee: BorgWarner Inc., Auburn Hills, MI (US)

(*) Notice: Subject to any disclaimer, the term of this patent is extended or adjusted under 35 U.S.C. 154(b) by 654 days.

(21) Appl. No.: 13/882,598

(22) PCT Filed: Nov. 3, 2011

(86) PCT No.: PCT/US2011/059045
§ 371 (c)(1),
(2), (4) Date: Apr. 30, 2013

(87) PCT Pub. No.: WO2012/064572
PCT Pub. Date: May 18, 2012

(65) Prior Publication Data
US 2013/0216375 A1   Aug. 22, 2013

(30) Foreign Application Priority Data

Nov. 8, 2010 (DE) .................... 10 2010 050 733

(51) Int. Cl.
*F01D 25/24* (2006.01)
*F02B 37/18* (2006.01)
*F02C 6/12* (2006.01)

(52) U.S. Cl.
CPC .......... *F01D 25/243* (2013.01); *F01D 25/24* (2013.01); *F02B 37/186* (2013.01); *F02C 6/12* (2013.01); *F05D 2220/40* (2013.01); *Y02T 10/144* (2013.01); *Y10T 29/49236* (2015.01)

(58) Field of Classification Search
CPC .......... F01D 25/243; F02B 37/186; F02C 6/12
See application file for complete search history.

(56) References Cited

U.S. PATENT DOCUMENTS

| 3,136,227 A | * | 6/1964 | Williams | B60T 17/086 92/128 |
| 4,056,043 A | * | 11/1977 | Sriramamurty | F15B 15/02 403/131 |
| 4,517,803 A | * | 5/1985 | Jamison | F02B 37/16 137/859 |
| 5,172,552 A | * | 12/1992 | Elpern | F02B 37/18 251/294 |
| 5,280,872 A | * | 1/1994 | Yamanaka | E03F 1/006 137/205 |
| 5,746,058 A | | 5/1998 | Vertanen | |

(Continued)

*Primary Examiner* — Woody Lee, Jr.
*Assistant Examiner* — Brian O Peters
(74) *Attorney, Agent, or Firm* — Eric L. Doyle; Stephan A. Pendorf; Patent Central LLC

(57) ABSTRACT

An exhaust-gas turbocharger (1) having a charger housing (2) which has a compressor housing (3), a turbine housing (4) and a bearing housing (5), and having a control capsule (6) which is fastened to the charger housing (2) and which has a housing lower part (7) and a housing upper part (8). The charger housing (2) has a fastening bracket (9), and the control capsule housing lower part (7) and housing upper part (8) are formed as individual parts which can be preassembled to form the control capsule (6) and which are separate from the charger housing (2) and which, in the mounted state of the control capsule (6), are connected to the fastening bracket (9).

7 Claims, 3 Drawing Sheets

(56) References Cited

U.S. PATENT DOCUMENTS

Figure 1:
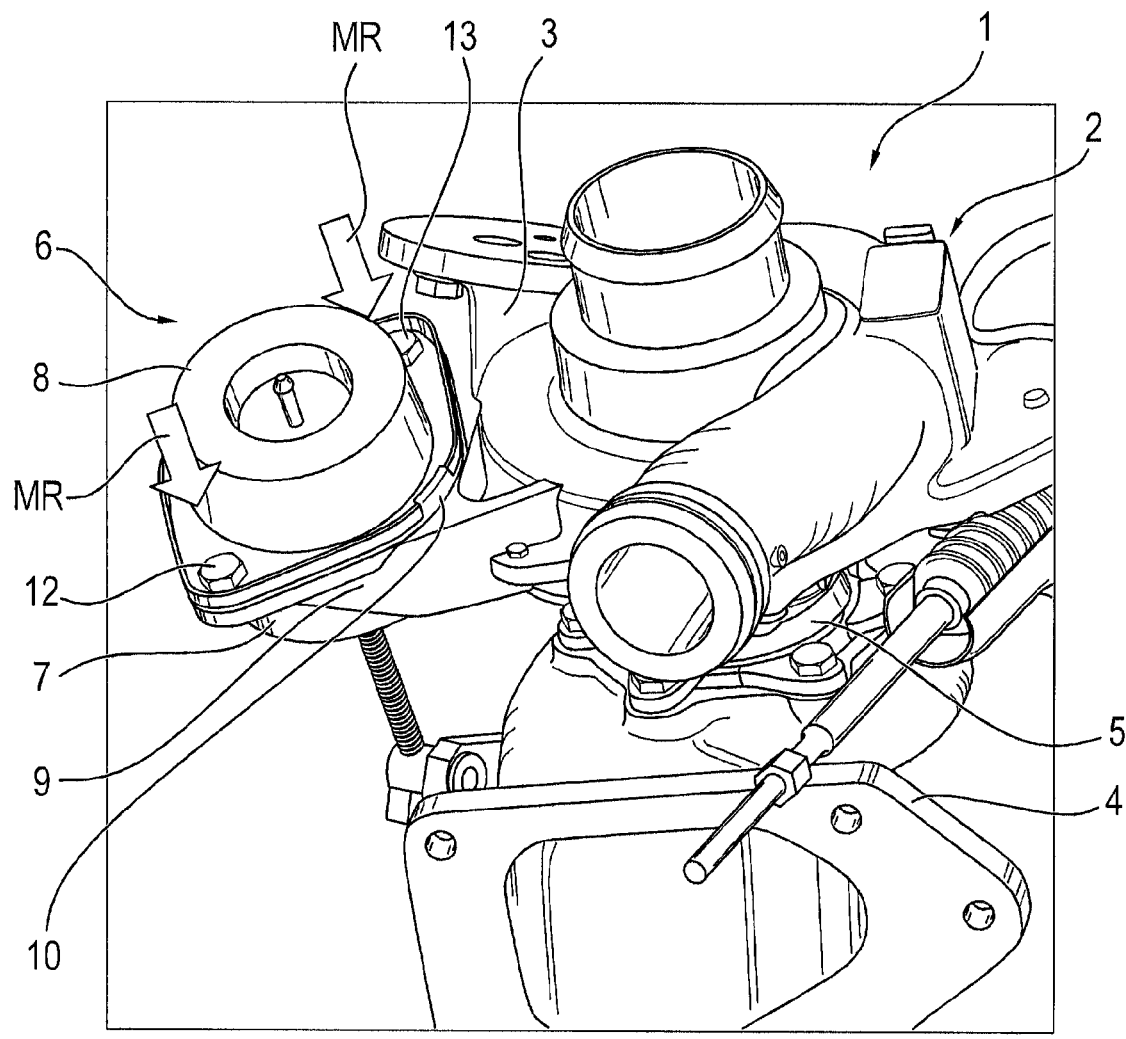

| | | | |
|---|---|---|---|
| 5,771,774 A * | 6/1998 | Stojic | B60T 17/083 29/888.06 |
| 6,164,187 A * | 12/2000 | Stojic | B60T 17/085 92/63 |
| 6,189,435 B1 | 2/2001 | Vertanen | |
| 6,658,846 B1 | 12/2003 | McEwan | |
| 7,290,392 B2 | 11/2007 | Jones | |

* cited by examiner

EXHAUST-GAS TURBOCHARGER AND METHOD FOR MANUFACTURING THE SAME

The invention relates to an exhaust-gas turbocharger as per the preamble of claim 1, and to a method for manufacturing the same, as per claim 5.

A generic turbocharger is known from DE 10 2007 055 630 A1. The known exhaust-gas turbocharger has a control device in the form of a pressure capsule which has a housing lower part and a housing cover or a housing upper part. Here, the housing lower part of the control housing of the control capsule is an integral constituent part of the charger housing. An adjusting device is provided with a membrane or diaphragm, with an actuating element, for example an actuating rod 18, connected at one end to the diaphragm and at the other end to a regulating device, to control or regulate charge pressure via the regulating device 19 (see FIG. 3).

This firstly results in a very complex design of the charger housing, and secondly, the control capsule cannot be formed as a preassemblable separate part that can be manufactured independently of the exhaust-gas turbocharger or of the charger housing, because, as stated, the housing lower part is an integral constituent part of the charger housing.

It is therefore an object of the present invention to provide an exhaust-gas turbocharger as per the preamble of claim 1 and a method for manufacturing the same as per claim 5 which permit a simplification of the design of the control capsule and a simplification of the mounting of the control capsule on the charger housing as a result of an improvement in accessibility to the fastening device.

Said object is achieved by means of the features of claim 1 and of claim 5.

According to the teaching of claim 1, the charger housing of the exhaust-gas turbocharger has a fastening bracket, whereas the housing lower part and the housing upper part or the housing cover of the control capsule are separate individual parts which can be preassembled because they do not form an integral constituent part of the charger housing.

In fact, for the mounting of the control capsule, the housing lower part and the housing upper part are connected directly to the fastening bracket, which firstly yields the advantage that the connecting points are easily accessible, and secondly, that no holders for the housing lower part and for the housing upper part are required because the clamping of said two parts of the control capsule takes place during the course of the mounting thereof on the fastening bracket.

The subclaims relate to advantageous refinements of the invention.

The connecting device is preferably formed as a screw connection which has at least two screws which, in the assembled state, extend through mounting portions of the housing lower part and of the housing upper part and which can be screwed into threaded recesses of the fastening bracket.

Because a conventional holder for the housing upper part and the housing lower part can be dispensed with according to the invention, for preassembly, these need be provided merely with a partial flange formation or at least one clip, usually two clips, which however merely constitutes a transport securing facility in order that the housing upper part does not become detached from the housing lower part on account of the compression spring arranged in the control capsule.

Claims 5 to 10 define the method according to the invention for manufacturing an exhaust-gas turbocharger.

According to said method, firstly the charger housing is manufactured and provided with a fastening bracket, which either may be integrally formed or may constitute a separate component which can be connected in a suitable way to the charger housing.

After the manufacture of the housing lower part and of the housing upper part of the control capsule, said two components are preassembled by being joined together by means of a transport securing facility.

This is followed by the fixing of the preassembled control capsule to the fastening bracket, such that in one working step, both the housing lower part and the housing upper part can be clamped to one another and the control capsule can be mounted on the charger housing. Preferably, the fixing of the control capsule (6) to the charger housing (2) takes place in fully automatic fashion.

Subclaims 6 to 10 relate to advantageous refinements of the method according to the invention.

Figure 2:
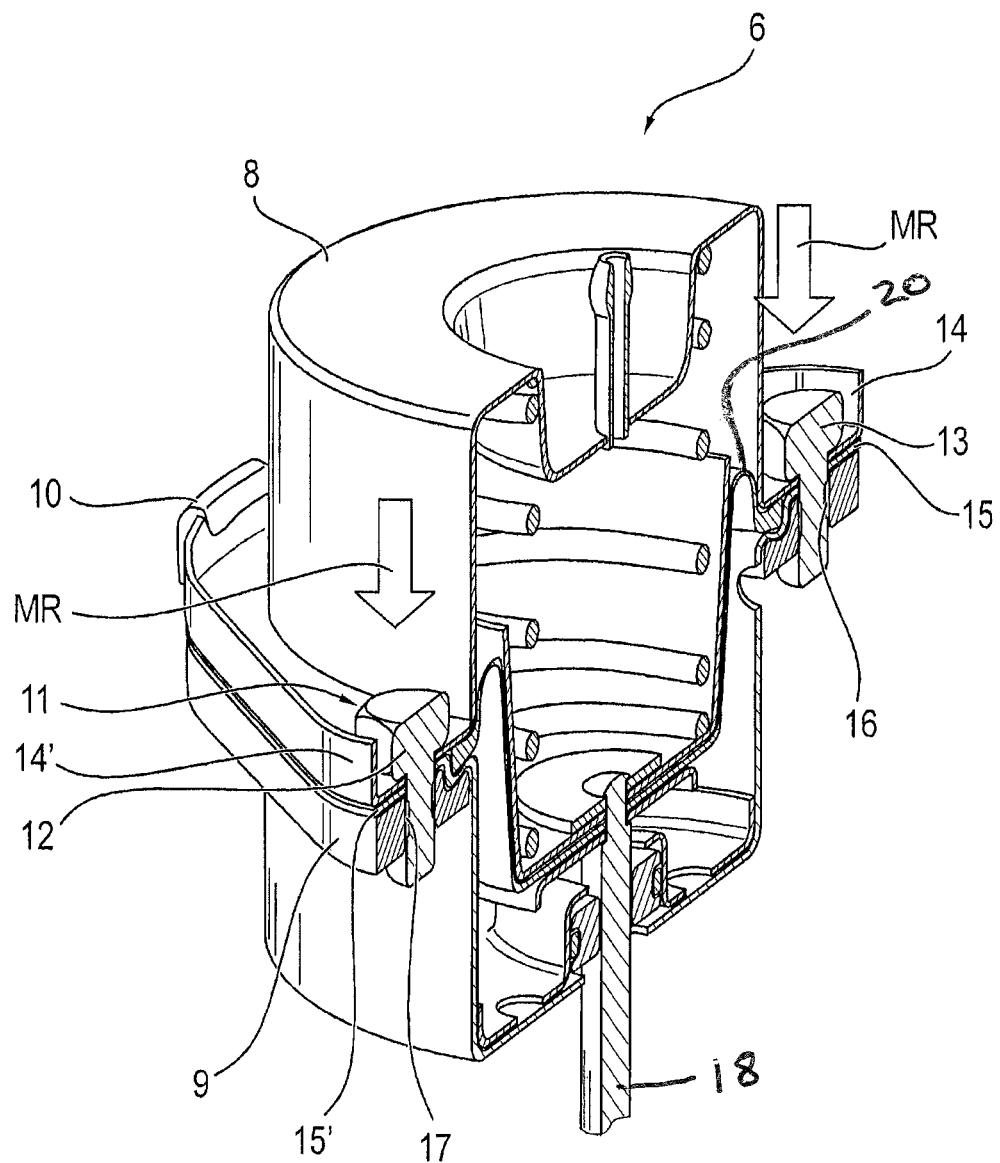
Figure 3:
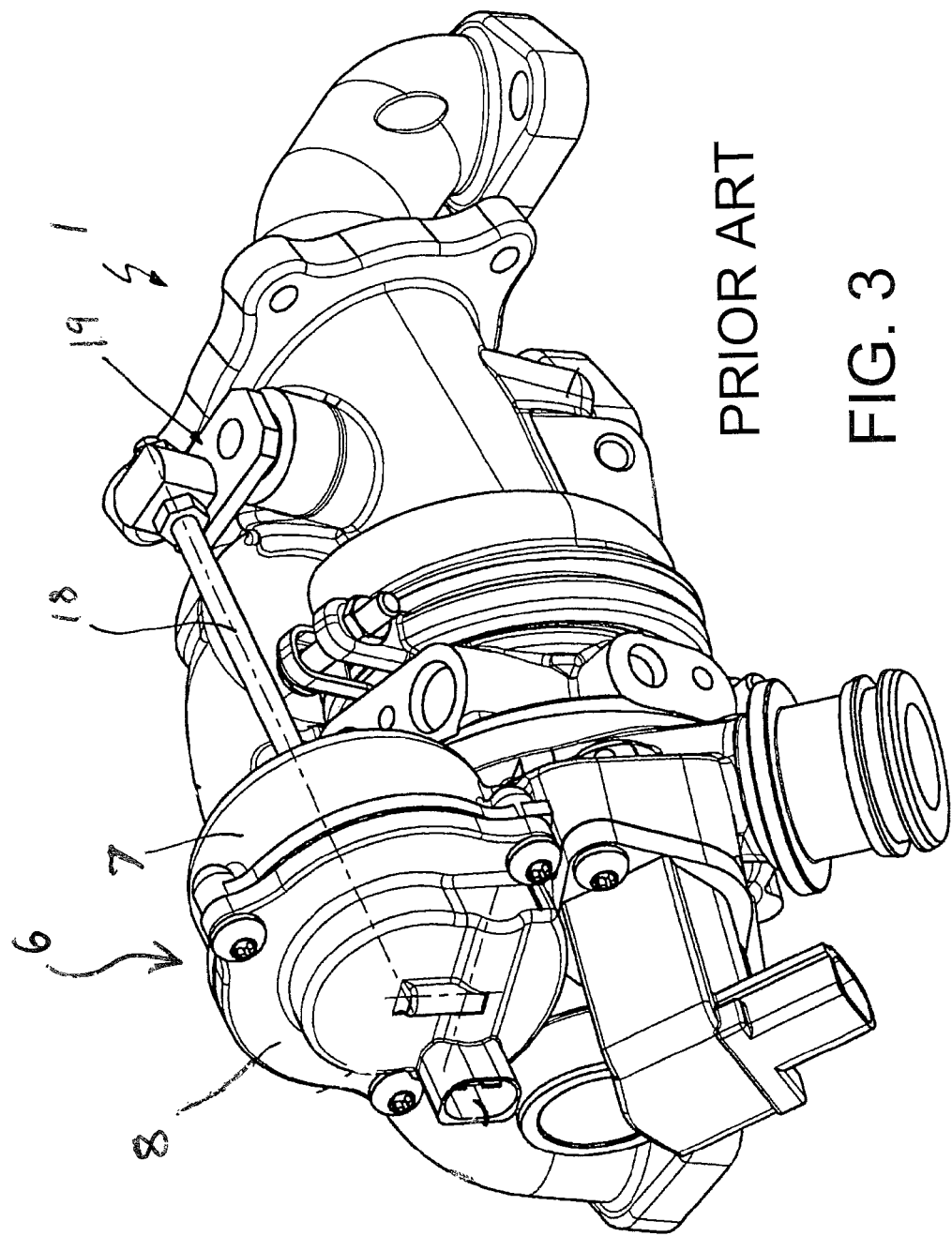

Further details, advantages and features of the present invention will emerge from the following description of an exemplary embodiment on the basis of the drawing, in which:

FIG. 1 shows a perspective illustration of an exhaust-gas turbocharger according to the invention, FIG. 2 shows a perspective longitudinal section through the control capsule of the exhaust-gas turbocharger, and FIG. 3 shows a prior art turbocharger with control capsule connected to a regulating device via an actuating rod.

FIG. 1 illustrates an exhaust-gas turbocharger 1 which has a charger housing 2 which is formed in its entirety by a compressor housing 3, a turbine housing 4 and, arranged between these, a bearing housing 5 for mounting a rotor shaft. The rotor shaft with its compressor wheel arranged at the compressor side and its turbine wheel arranged at the turbine side is not shown in FIG. 1, because the explanation of said components, and also of other conventional components of such turbochargers, is not necessary for explaining the principles of the present invention.

The exhaust-gas turbocharger 1 is provided with a control device in the form of a control capsule 6. The control capsule 6 has a housing lower part 7 and a housing upper part (housing cover) 8 which, according to the principles of the present invention, are connected by means of a transport securing facility 10 for preassembly. The transport securing facility 10 may take the form of a partially flanged portion. It is alternatively possible for one or a multiplicity of clips to be provided for preassembly. The control capsule provided with a diaphragm 20 operatively connected with an actuating element, for example an actuating rod 18 to control or regulate charge pressure. The spring loaded diaphragm 20 separates the control capsule 6 into an upper chamber and a lower chamber.

As can be seen in particular from FIG. 1, the charger housing 2 is provided, for the final mounting of the control capsule 6, with a fastening bracket 9 which either may be an integral constituent part of the bearing housing 2 or which may be fixed to the charger housing 2 by means of suitable fastening devices. In the example illustrated in FIG. 1, the fastening bracket 9 is arranged on the compressor housing 3. In principle, however, an arrangement on the turbine housing 4 or on the bearing housing 5 is also possible depending on the design of the turbocharger.

After the preassembled control capsule 6 has been delivered for final mounting, it is fixed to the fastening bracket 9 by means of a connecting device, in the form of a screw connection 11 in the example. In the example, the screw connection 11 has two screws 12 and 13 which, as can be seen in particular from FIG. 2, extend through two diametrically opposite fastening portions 14, 14' of the housing upper part 8 and 15, 15' of the housing lower part 7 and which are screwed into two threaded recesses 16 and 17 of the fastening bracket 9. The mounting direction is indicated in FIGS. 1 and 2 by in each case two arrows MR. It is clear that the mounting takes place from above, that is to say from the side of the housing upper part 8, wherein the design according to the invention yields a considerable improvement in accessibility to the screw connection 11.

In addition to the written disclosure of the invention above, for supplementary disclosure thereof, reference is hereby explicitly made to the illustrations in FIGS. 1 and 2.

LIST OF REFERENCE SYMBOLS

1 Exhaust-gas turbocharger
2 Charger housing
3 Compressor housing
4 Turbine housing
5 Bearing housing
6 Control capsule
7 Housing lower part
8 Housing upper part (housing cover)
9 Fastening bracket
10 Transport securing facility (flanged portion or clip or clips)
11 Screw connection
12, 13 Screws
14, 14' Fastening portions
15, 15' Fastening portions
16, 17 Threaded recesses
MR Mounting direction

The invention claimed is:

1. An exhaust-gas turbocharger (1) comprising: a charger housing (2) having a compressor housing (3), a turbine housing (4) and a bearing housing (5), a control capsule (6) fastened to the charger housing (2) and which has a housing lower part (7) in which there is formed a second air chamber and a housing upper part (8) in which there is formed a first air chamber, the first air chamber and second air chamber separated from one another in gas-tight fashion by a spring-loaded diaphragm, wherein a regulating rod is connected at one end in force-transmitting fashion to the diaphragm, wherein the charger housing (2) has a fastening bracket (9), and the control capsule housing lower part (7) and housing upper part (8) are formed as individual parts which have flanges and are connected to each other by a flange formation (10) to form the control capsule (6) and which control capsule housing lower part (7) and housing upper part (8) are separate from the charger housing (2) and which, in the mounted state of the control capsule (6), are both directly connected to the fastening bracket (9) and connected to each other and the fastening bracket (9) via a screw connection realized from the side of the housing upper part (8) extending through the flanges into threaded bores in the fastening bracket (9).

2. The exhaust-gas turbocharger as claimed in claim 1, wherein the control capsule (6) is a diaphragm type actuator.

3. A method for manufacturing an exhaust-gas turbocharger (1), having the following method steps: manufacturing a charger housing (2) including an integral bracket (9) adapted for receiving a control capsule (6), the bracket including threaded bores adapted to receiving screws; manufacturing a housing lower part (7) of a control capsule (6) having a flange; manufacturing a housing upper part (8) of the control capsule (6) having a flange; preassembling the control capsule (6) by assembling and joining the housing lower part (7) and the housing upper part (8) together by means of a transport securing facility (10) selected from (a) clip and (b) folding a part of the flange from one housing part over the flange of the other housing part; and fixing the preassembled control capsule (6) to the fastening bracket (9) by means of a screw connection, wherein a screw connection is realized by introduction of screws through the flanges and into the bracket from the side of the housing upper part (8).

4. The method as claimed in claim 3, characterized by the method step of preassembling the control capsule (6) by connecting the housing lower part (7) and the housing upper part (8) by means of a partial flange formation.

5. The method as claimed in claim 3, characterized by the method step of preassembling the control capsule (6) by attaching at least one clip to the housing lower part (7) and to the housing upper part (8).

6. The method as claimed in claim 3, wherein the fixing of the control capsule (6) to the charger housing (2) takes place in fully automatic fashion.

7. A method for manufacturing an exhaust-gas turbocharger (1), having the following method steps:
manufacturing a charger housing (2)
attaching a bracket to the charger housing, the bracket including an integral, the bracket (9) adapted for receiving a control capsule (6), the bracket including threaded bores adapted to receiving screws;
manufacturing a housing lower part (7) of a control capsule (6) having a flange;
manufacturing a housing upper part (8) of the control capsule (6) having a flange;
preassembling the control capsule (6) by assembling and joining the housing lower part (7) and the housing upper part (8) together by means of a transport securing facility (10) selected from (a) clip and (b) folding a part of a flange from one housing part over the flange of the other housing part; and
fixing the preassembled control capsule (6) to the fastening bracket (9) by means of a screw connection, wherein a screw connection is realized by introduction of screws through the flanges and into the bracket from the side of the housing upper part (8).

* * * * *